Feb. 11, 1930. T. MULCAHY 1,746,403
LEAD BRIDLE
Filed April 23, 1927
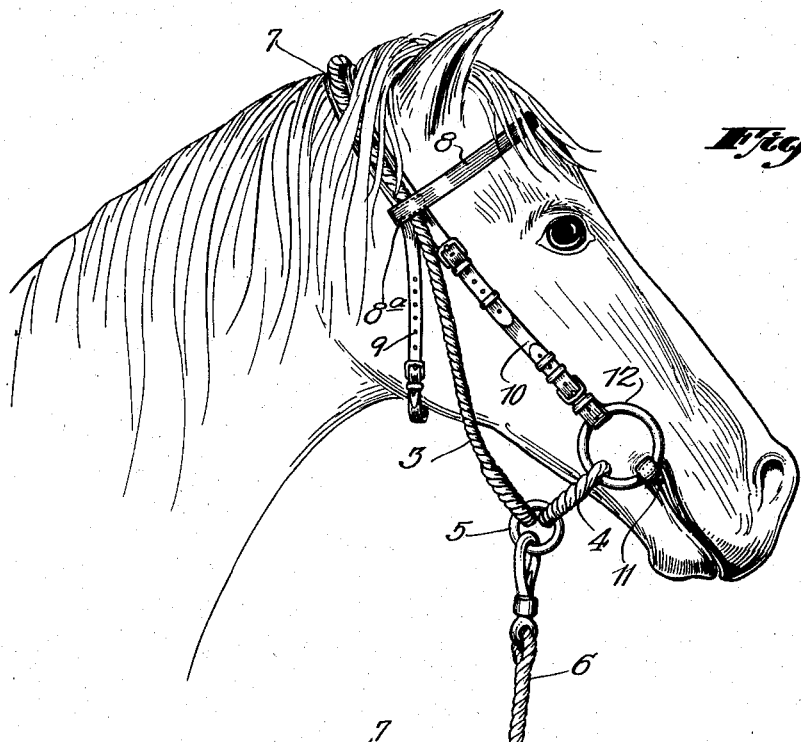
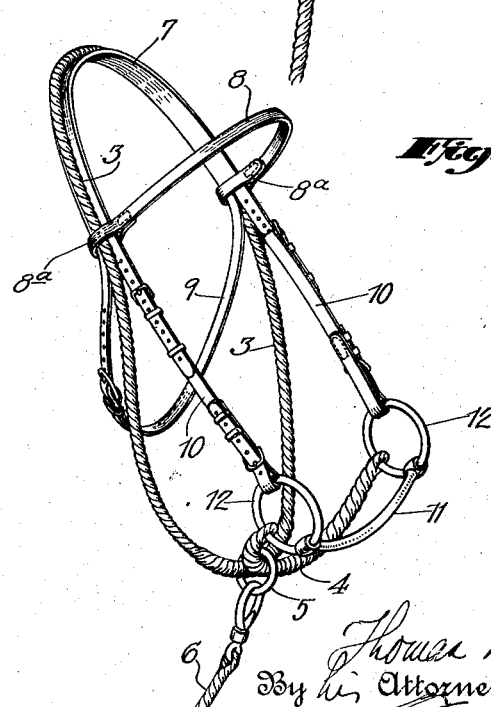
Inventor
Thomas Mulcahy
By his Attorney
Frank J. Kent Patented Feb. 11, 1930

1,746,403

UNITED STATES PATENT OFFICE

THOMAS MULCAHY, OF SOUTH MILLBROOK, NEW YORK

LEAD BRIDLE

Application filed April 23, 1927. Serial No. 186,049.

The subject of this invention is a bridle of a novel type, particularly useful for facilitating the leading of young horses.

One object of the invention is to provide a head harness including readily manipulable elements for applying various desired guiding, instructional and compelling pressures on the animal's head.

Another object is to provide a lead bridle of simple and practical type whereby the horse being lead may at will be subjected to a direct mouth pressure, as through a bit, when pulling forward, or subjected to other and differently applied pressures when pulling back or sideways.

Another object is to provide a bridle having a pull-applying means, as a halter, and pressure exerting elements, one preferably a bit, and the other preferably a head-pulling device connected to the poll-piece at about the forehead-band location, these parts so combined and arranged that head-pulling force may be subordinated to mouth-pull, or mouth-pull subordinated to head-pull, at any juncture desired.

Various other objects and advantages of the invention than those hereinabove mentioned will be specifically pointed out or will be apparent hereinafter in the course of the below detailed description of the form of the invention shown, in the accompanying drawing, as a preferred one of the various possible embodiments of the invention; it being understood, naturally, that such form is merely illustrative of one of the many possible combinations and arrangements of parts well calculated to attain the objects of the invention, and hence said detailed description of such form is not to be taken as at all defining or limiting the invention itself. That is to say, the scope of protection contemplated is of course to be taken from the appended claims, interpreted as broadly as is consistent with the prior art.

In the accompanying drawing:

Fig. 1 shows the horse's head in side elevation, bridled in accordance with the invention;

Fig. 2 is a perspective view of the bridle of Fig. 1.

The form of the invention shown incorporates means for exerting direct or bit-pressure on the horse's mouth when he is pulling directly forward, and also means for leaving his mouth free of the bit-pressure while exerting direct pressure on his poll when he is pulling toward a side or pulling back.

Both of these means last-mentioned are in said form constituted as loop elements, as indicated at 3 and 4; the head-pull device 3 being a closed loop passing at its upper portion over the poll, and the mouth-pull device 4 being a half-loop hung like the familiar curb-chain, only looser.

The lower part of loop 4, or of the head-loop, as it may be called, and the lower or central part of the half-loop 4, or chin-band as it may be called, both pass loosely or runningly through a slide-ring 5, to which also is connected the halter or lead-rope 6.

These devices 3 and 4 are co-operant with various well-known parts of the bridle illustrated, which is more or less conventional in type except for the omission of the customary nose-band. While of course another suitable type of head-stall may be employed, the bridle shown is an ordinary riding bridle, including a poll-piece 7, a forehead-band 8, a throat-latch 9, and cheek-pieces 10, and having a snaffle-bit 11 the cheek-rings 12 of which are connected to the lower ends of the cheek-pieces 10.

As to the devices 3 and 4 these are preferably ropes, cables, straps or other properly flexible members or devices; and are here illustrated as of round or twisted leather.

The two ends of the half-loop or chin-band 4 are secured in any suitable manner to the cheek-rings 12.

The head-loop 3 lies at its top portion over the poll-piece 7 down as far as the eyes $8^a$ of the fore-head band. After passing through these two eyes $8^a$ on opposite sides of the horse's head, the head-loop depends to pass down along both the horse's cheeks and then below the latter to the point where it and the head-loop pass loosely through slide-ring 5.

This slide-ring 5, or equivalent, should be large enough for the purpose just indicated and particularly for sliding freely from one end to the other of the chin-strap or lower loop 4, and strong enough to hold a full pull from the horse's head. In the present case, slide-ring 5 is a metal ring of about two inches diameter.

*Operation*

The pivotal point of the head-loop 4 is at the poll of the horse when slip-ring 5 is held by the halter or lead-rein 6.

With the lead-rein extending backward from the ring 5, any backward pull on the lead-rein, or any forward, or forward and upward motion of the horse's head, will cause the head-loop 4 to swing backward on its "poll-pivot" and permit all backward pull on the lead-rein to exert direct pressure on the chin-band 3 and hence on the bit 11 and on the horse's mouth.

When pressure is put on the lead-rein while extended toward either side, ring 5 will slip freely over and along the chin-band 3 and all the side pull will be placed on the head-loop 4 and hence on the poll of the horse.

When the horse pulls backward against the lead-rein, the restraining pressure applied to the lead-rein will be exerted directly through the ring 5 and the head-loop 4 to the horse's poll. Thus in this case also there will be no pressure put on the bit 11 or the horse's mouth.

Inasmuch as many changes could be made in the above construction, and many apparently widely different embodiments of the invention could be made without departing from the scope thereof, it is intended that all matter contained in the above description or shown in the accompanying drawings shall be interpreted as illustrative and not in a limiting sense.

It is also to be understood that the language contained in the following claims is intended to cover all the generic and specific features of the invention herein described and all statements of the scope of the invention which, as a matter of language, might be said to fall therebetween.

I claim:

1. In a bridle, the combination of a poll-piece, a bit, a bit carrying means connected to the poll-piece, an O-loop member depending from the poll-piece to in rear of the horse's face, a U-loop member connected at its ends to the bit, and a slide-device coupling the lower part of the O-loop and the intermediate part of the U-loops.

2. In a bridle, the combination of a poll-piece, a bit, a bit carrying means connected to the poll-piece, a flexible head-loop dependent from the poll-piece, a chin-band dependent from the bit-rings, said head-loop and chin-band being of such lengths that the chin-band may be rearwardly extended to have its central portion spaced in back of the horse's chin and the head-loop may have its lower portion brought against said central portion of the chin-strap, and a slide-means loosely embracing said two portions of the head-loop and chin-band.

In testimony whereof I affix my signature.
THOMAS MULCAHY.